United States Patent [19]

Matsuno et al.

[11] Patent Number: 4,814,133
[45] Date of Patent: Mar. 21, 1989

[54] METHOD OF FORMING THE SPACER OF AN OPTICAL FIBER CABLE

[75] Inventors: Shigehiro Matsuno; Kazuaki Toda, both of Gifu, Japan

[73] Assignee: Ube-Nitto Kasei Co., Ltd., Tokyo, Japan

[21] Appl. No.: 174,881

[22] Filed: Mar. 29, 1988

Related U.S. Application Data

[60] Division of Ser. No. 937,007, Dec. 2, 1986, Pat. No. 4,781,434, which is a continuation-in-part of Ser. No. 889,341, Jul. 24, 1986, abandoned.

[51] Int. Cl.$^4$ ............................................. G02B 6/44
[52] U.S. Cl. ........................................ 264/174; 264/1.5
[58] Field of Search ................ 264/1.4, 1.5, 173, 174; 350/96.23

[56] References Cited

U.S. PATENT DOCUMENTS

| | | |
|---|---|---|
| 2,446,620 | 8/1948 | Swallow et al. . |
| 2,721,820 | 10/1955 | Von Reis et al. . |
| 2,770,014 | 11/1956 | Nordlin et al. . |
| 3,290,420 | 12/1966 | Orser . |
| 3,411,181 | 11/1968 | Cawley . |
| 3,470,051 | 9/1969 | Meyer . |
| 3,513,228 | 5/1970 | Miyauchi et al. . |
| 3,529,050 | 9/1970 | Smith . |
| 3,538,207 | 11/1970 | Toole . |
| 3,588,954 | 6/1971 | Nakamura et al. . |
| 3,865,466 | 2/1975 | Slaughter . |
| 3,946,097 | 3/1976 | Takahashi et al. . |
| 3,993,726 | 11/1976 | Moyer . |
| 4,038,018 | 7/1977 | Pepmeier . |
| 4,089,923 | 5/1978 | Theodossi et al. . |
| 4,156,104 | 5/1979 | Mondello . |
| 4,247,271 | 1/1981 | Yonekura et al. . |
| 4,356,143 | 10/1982 | Hill et al. . |
| 4,389,088 | 6/1983 | Trezeouet . |
| 4,394,338 | 7/1983 | Fuwa . |
| 4,550,976 | 11/1985 | Cooper et al. . |
| 4,701,015 | 10/1987 | Saito et al. . |
| 4,725,121 | 2/1988 | Priaroggia .................. 350/96.23 |

FOREIGN PATENT DOCUMENTS

| | | |
|---|---|---|
| 42996 | 1/1982 | European Pat. Off. . |
| 54-124744 | 9/1979 | Japan . |
| 55-70807 | 5/1980 | Japan . |
| 149910 | 7/1986 | Japan .................. 350/96.23 |
| 179407 | 8/1986 | Japan .................. 350/96.23 |
| 179408 | 8/1986 | Japan .................. 350/96.23 |
| 1048370 | 11/1966 | United Kingdom . |
| 1569905 | 6/1980 | United Kingdom . |
| 2078996 | 1/1982 | United Kingdom . |

*Primary Examiner*—James Lowe
*Attorney, Agent, or Firm*—Wenderoth, Lind & Ponack

[57] ABSTRACT

A method for forming a spacer of an optical fiber cable includes the steps of providing a tension member and covering it with a spacer body of crystalline thermoplastic resin, the spacer body being formed on its outer periphery with a plurality of grooves each for supporting an optical fiber therein. An apparent diameter $d_0$ of the tension member and a target diameter $d_3$ of the spacer body measured at bottoms of the grooves are so determined as to satisfy an expression $0.5 < d_0/d_3 < 1$.

3 Claims, 4 Drawing Sheets

METHOD OF FORMING THE SPACER OF AN OPTICAL FIBER CABLE

This application is a division of copending U.S. patent application Ser. No. 937,007, filed Dec. 2, 1986, now U.S. Pat. No. 4,781,434, which is a continuation-in-part of U.S. patent application Ser. No. 889,341, filed July 24, 1986 entitled METHOD FOR FORMING A SPACER OF OPTICAL FIBER CABLE, now abandoned.

BACKGROUND OF THE INVENTION

This invention relates to a spacer of an optical fiber cable for supporting and protecting a plurality of optical fibers and a method for forming such a spacer.

An optical fiber cable for telecommunication purposes is well known in the art and typically comprises a plurality of optical fibers arranged around a tension member.

In one of the known optical cables, the tension member is sheathed by a spacer body which is formed of thermoplastic resin and is provided with a plurality of longitudinally extending grooves for retaining optical fibers therein. Accordingly, strict dimensional accuracy of the grooves is required in order not to affect transmission characteristics of the optical fibers. Such spacer is made by extruding molten thermoplastic resin around the tension member through a stationary or rotary die having an opening of desired shape and then solidifying it by cooling. The grooves are formed in accordance with the shape of the die opening and, in the case of use of a rotary die, helical grooves are formed longitudinally on the spacer. The diameters of the tension member and the spacer body, depth and number of the grooves, etc. depend on the requirements of the optical fiber cable to be manufactured, and spacers of various designs and dimensions have been used.

Figure 3A:
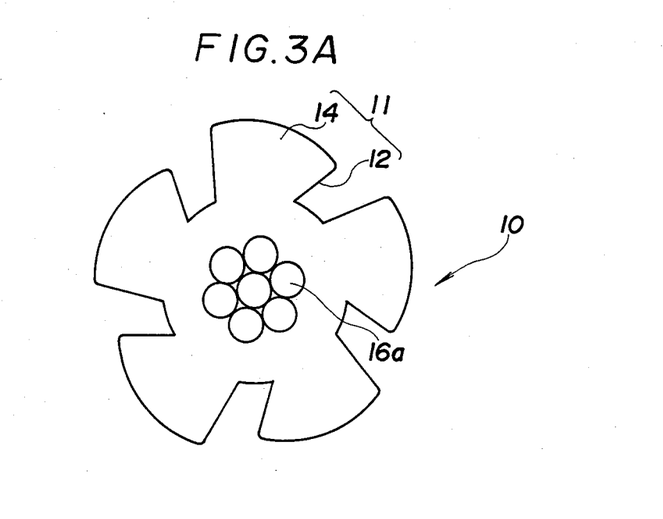
FIGS. 3A and 3B are enlarged cross-sectional views of spacers formed in accordance with a conventional method and a method of the present invention, respectively.

However, the above method has the following problems. That is, when a ratio of the diameter of the tension member, which diameter is determined by a required tensile strength, to the root diameter (dimension between two opposed groove bottoms) of the spacer body is relatively small and when the spacer body is composed of a single coat of thermoplastic resin around the tension member, the grooves or spacer body often get deformed as shown in FIG. 3A and it is difficult to attain the desired dimensional accuracy with good yield. This tendency is very remarkable when a crystalline thermoplastic resin such as polyethylene or polypropylene is used. This is believed to be caused by a drastic shrinkage due to crystallization when the crystalline thermoplastic resin is cooled and solidified.

The inner part of the spacer body takes more time to solidify than the peripheral part thereof so that the inner part, during its solidifying process, pulls the peripheral part which has already been solidified to a great extent. Further, in the method of forming the helical grooves by rotating the die, it is much more difficult to attain the dimensional uniformity of the grooves because the stress is applied to the extruded resin differently than when forming linear grooves.

Various materials such as metal wires, high strength synthetic fibers and fiber reinforced plastics (FRP) have been proposed to be used as the tension member, and glass fiber reinforced plastic is particularly suitable for this purpose because of its small specific gravity, large tensile strength, non-electroconductivity and coefficient of thermal expansion and flexibility similar to those of the optical fibers. An adhesive strength between the tension member and the spacer body must be sufficiently large so that they will not separate from each other due to change of atmospheric temperature to which the cable is subjected. Based on a coefficient of thermal expansion of usually employed thermoplastic resins, and assuming that the cable is subjected to a temperature change of 40° C., it is necessary that the above-mentioned adhesive strength be more than 60 kg/cm$^2$ in order to avoid the separation which would destroy the function of tension member. However, the known spacer in which the tension member of glass fiber reinforced plastic is first hardened by passing it through a molding die and is then sheathed by the spacer body, has only an insufficient adhesive strength of about 30 kg/cm$^2$ at the most. This is because of a smoothness of the inner surface of the molding die and a consequent smooth outer surface of the tension member, the smooth inner surface of the molding die being required in order to reduce resistance during a drawing operation. Consequently, in the known spacer a main factor that prevents the spacer body from separating from the tension member is the shrinkage force of the spacer body created when it is solidified.

Such a poor adhesive strength involves a possibility that the helical grooves of the spacer body are displaced relative to the tension member during arrangement of the optical fibers, resulting in various troubles due to incorrect phase. Further, the spacer body of thermoplastic material, which has a coefficient of thermal expansion larger than that of the tension member, would act on the optical fibers to impart thermal stress thereto as the atmospheric temperature changes, causing an increase of transmission loss due to microbending.

SUMMARY OF THE INVENTION

It is therefore an object of the present invention to provide a method for forming a spacer of an optical fiber cable having dimensional accuracy, especially longitudinal and cross-sectional uniformity of the grooves thereof.

Another object of the present invention is to provide a spacer of an optical fiber cable in which a tension member and a spacer body may be intimately adhered together.

A further object of the invention is to provide a method for forming a spacer of an optical fiber cable, whereby it is possible to increase the adhesive strength between the tension member and the spacer body.

According to one aspect of the invention, a method for forming a spacer of an optical fiber cable comprises the steps of providing a tension member and covering the tension member with a spacer body of crystalline thermoplastic resin. The spacer body has formed on an outer periphery thereof a plurality of grooves each for supporting an optical fiber therein. The characteristic feature of the invention resides in that an apparent diameter (d0) of the tension member and a target diameter (d3) of the spacer body measured at bottoms of the grooves are so determined as to satisfy an expression $0.5 < d0/d3 < 1$.

The tension member may comprise a tension cable of one of a steel wire and a fiber reinforced plastic rod. The reinforcing fibers may be glass fibers, carbon fibers, aromatic polyamid fibers or other suitable fibers of large strength and resistance to stretch. In such case, the diameter (d0) is a diametrical dimension (d1) of the tension cable. The term "apparent" is used because stranded wires or rods may be employed. Alternatively, the tension member may include a thermoplastic resin layer covering the above-mentioned tension cable, in which case the diameter (d0) is an outer diameter (d2) of the layer. Meanwhile, the diameter (d3) is a diametrical dimension of a circle that inscribes bottoms of the grooves, and is a target value of the spacer body to be formed.

In case that the tension member includes the thermoplastic resin layer, it may be formed of various modified polyethylenes such as linear low density polyethylene (LLDPE), high density polyethylene (HDPE), adhesive polyethylene; copolymers thereof; homopolymers and copolymers of polypropylene, and the crystalline thermoplastic resin of the spacer body is selected to have fusibility with the layer of the tension member.

In the present method described above, the ratio of the outer diameter (d0) of the tension member to the target diameter (d3) of the spacer body (d0/d3) is more than 0.5 and less than 1, which means the diameter of the tension member is relatively large; Therefore, when the spacer body covering the tension member is cooled, solidification proceeds at the same rate in both the peripheral portion and the inner portion inside the grooves of the spacer body, which prevents the inner portion from pulling the peripheral portion during solidification. As a result, spacers having dimensional uniformity and accuracy with desired grooves can be obtained.

When stranded wires or FRP rods are used as the tension cable, it is preferable to cover such cable with the thermoplastic resin layer in order to remove the influence on the shape of the spacer body of the stranded tension cable.

The above expression $0.5 < d0/d3 < 1$ has been ascertained and determined through experiments by the present inventors. If d0/d3 is less than 0.5, the inner portion at the grooves of the spacer body is too thick to achieve favorable results. On the other hand, as d0/d3 nears the upper limit 1 the inner portion becomes thinner, and it is possible to form the inner portion with a thickness of even less than 0.1 mm (this thickness means a radial dimension of the spacer body between the periphery of the tension member and the bottom of the groove.). Therefore, it is possible to set the ratio d0/d3 quite near 1 as long as the diameter d0 of the tension member is sufficiently uniformly sized. However, if it is not uniformly sized and d0/d3 is set quite near 1, the tension member, in its travel through the die, gets scraped by the nozzle so that problems such as irregularities in drawing tension might result.

Accordingly, when the ratio d0/d3 is near the lower limit of the expression, either the tension cable alone or the sheathed tension cable can be employed as the tension member, whereas it is desirable to employ the sheathed tension cable and to trim the sheathing layer thereof for diametrical uniformity of the tension member if the ratio is near the upper limit.

According to another aspect of the invention, a spacer of an optical fiber cable comprises a tension cable formed of fiber reinforced thermosetting resin and having a roughened outer surface, an intermediate layer of thermoplastic resin covering the tension cable, the intermediate layer having a roughened inner surface, and a spacer body formed of thermoplastic resin fusible with the resin of intermediate layer and having on an outer periphery thereof a plurality of helical grooves each for supporting an optical fiber therein. The roughened outer surface of the tension cable and the roughened inner surface of the intermediate layer cooperate together to achieve firm adherence therebetween due to an anchor effect resulting from contacting the thermosetting resin and the thermoplastic resin in a semifluid state under pressure. The outer surface of the intermediate layer and the inner surface of the spacer body are fused together.

The tension cable and the intermediate layer should preferably have an adhesive strength of more than 60 kg/cm$^2$.

A method according to the invention for forming a spacer for an optical fiber cable of the type as just described above comprises the steps of forming a tension cable by impregnating a reinforcing fiber bundle with uncured thermosetting resin, covering the tension cable with a molten thermoplastic resin, cooling and solidifying the thermoplastic resin to form an intermediate layer, hardening the thermosetting resin by heating under pressure to thereby firmly adhere the intermediate layer to the tension cable due to an anchor effect, covering the intermediate layer with a molten thermoplastic resin fusible with the resin of the intermediate layer, and cooling and solidifying the thermoplastic resin to form a spacer body having thereon a plurality of helical grooves.

The steps of hardening step of the thermosetting resin may include the steps of introducing the tension cable and the intermediate layer into a curing tank and of supplying a thermal-medium at a temperature in the vicinity of the melting point of the thermoplastic resin into the tank under pressure.

Other objects, features and advantages of the invention will be apparent from the following detailed description of preferred embodiments of the invention when taken in conjunction with the accompanying drawings, in which:

DETAILED DESCRIPTION OF THE INVENTION

Figure 1:
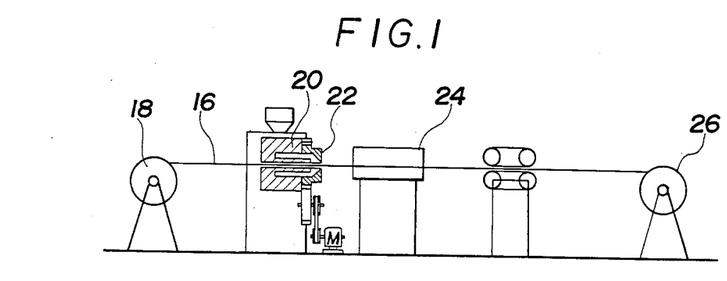
FIG. 1 is a schematic view illustrating a device for use in forming a spacer of an optical fiber cable according to an embodiment of the present invention.
Figure 2A:
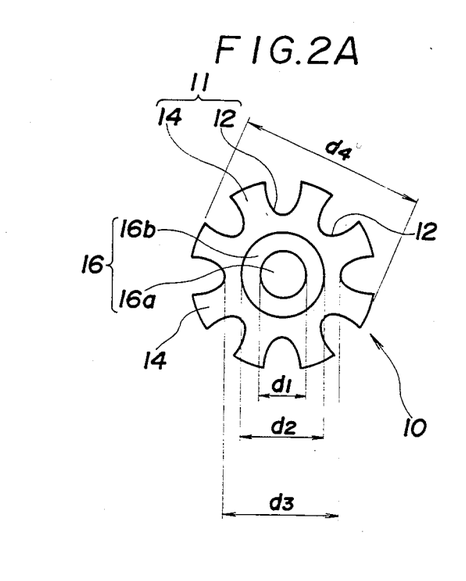
FIGS. 2A and 2B are a cross-sectional view and a perspective view, respectively, of the spacer formed by a method of the invention.
Figure 2B:
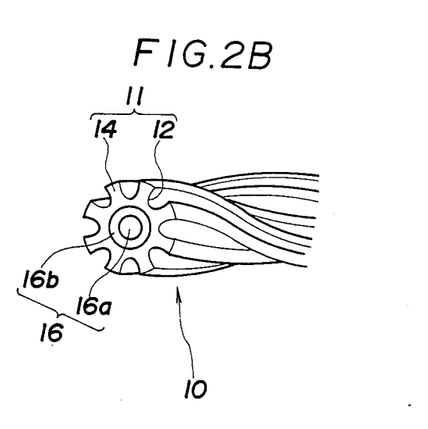

Referring to FIG. 1 of the drawings, there are shown devices for forming a spacer 10 comprising a tension member 16 and a spacer body 11 covering the tension member 16. The tension member 16 is led from a drum 18 through a crosshead die 20 with a rotary nozzle 22 having a cross section which corresponds to a cross section of the spacer body 11 to be obtained as shown in FIG. 2A. As the tension member 16 passes through the crosshead die, molten crystalline thermoplastic resin is extruded from the rotating nozzle 22 to enclose the tension member 16. A cooling tank 24 is provided downstream of the die 20 so that the thermoplastic resin is cooled and solidified, and the molding is then received by a take-up drum 26. The spacer body 11 thus formed has a plurality of longitudinally extending helical grooves 12 spaced from each other by ribs 14.

The tension member 16 may be either a tension cable 16a alone made up by a single steel wire or twisted wires, or a sheathed tension cable which is formed by covering the tension cable 16a with a thermoplastic resin layer 16b. By providing another die between the drum 18 and the crosshead die 20, this thermoplastic resin layer 16b and the spacer body 11 may be formed successively.

It is important here that the ratio of the diameters d0 to d3 (d0/d3) should be more than 0.5 and less than 1, that is, it should satisfy an expression $0.5 < d0/d3 < 1$. When the tension cable 16a is used alone the diameter d0 corresponds to a diameter d1 of the tension cable 16a, and when the tension member 16 has the resin layer 16b the diameter d0 corresponds to a diameter d2 of the layer 16b. The diameter d3 is target aimed diametrical dimension length of the spacer body 11 measured at the bottoms of the grooves 12, and such diameter hereinafter is referred to as "root diameter". The diameter d0 of the tension member 16, and a diameter d3' of the nozzle 22 measured at portions corresponding to the grooves must be so determined that the spacer body 11 to be formed will satisfy the above expression $0.5 < d0/d3 < 1$.

The root diameter d3 of the spacer body is a target length because the relation between the diameter d3' of the nozzle 22 and a root diameter of an actually formed spacer body depends on, for example, the elastic viscosity of the thermoplastic resin to be employed. Generally speaking, when a difference between the diameter d0 of the tension member 16 and the diameter d3' of the nozzle is relatively large, an actual root diameter of the spacer body tends to be larger than d3', and when the difference is relatively small, the actual root diameter tends to be near d3'.

Examples were prepared and will be described below for a better understanding of the present invention.

EXAMPLE 1

As a tension cable 16a was employed a stranded steel cable with an apparent diameter d1 of 1.2 mm which was formed by stranding nine steel wires each having a diameter of 0.38 mm (disposing three wires at the center and six around them). After degreased by acetone, this stranded steel cable was lead through a crosshead die in order to be sheathed by a thermoplastic resin layer 16b of linear low density polyethylene (LLDPE) having an MI (Melt index) of 1.0, and after cooling, a sheathed tension member 16 having a diameter d2 of 2.8 mm was obtained. Formed around the tension member 16 was a spacer body 11 of high density polyethylene (HDPE) having an MI of 0.2, by means of the die 20 of which nozzle 22 was dimensioned so as to form six equally spaced helical grooves 12 with target dimensions as follows outer diameter d4 5.7 mm, root diameter d3 3.0 mm, helical pitch 150 mm. Thus, the target ratio d2/d3 was set to 0.93.

The resulting spacers had actual dimensions as follows outer diameter 5.5 to 5.65 mm and root diameter 2.8 to 2.9 mm.

The irregularities in the width of the grooves and in the depth of the grooves were about 0.1 mm. This will be understood to be quite small compared with those of Comparative Example 1 which was almost of the same structure. Also, no deformation was found in the cross section of the spacer, so the results were satisfactory.

EXAMPLE 2

The same tension cable 16a as in Example 1 was employed and sheathed by a thermoplastic resin layer 16b of HDPE to make a tension member 16 having a diameter d2 of 2.0 mm. Then, a spacer body 11 was molded of HDPE with the following target dimensions to outer diameter d4 5.6 mm, root diameter d3 3.0 mm, helical pitch 155 mm. The target ratio d2/d3 was thus set to 0.67.

The resulting spacers had actual dimensions as follows outer diameter 5.8–5.9 mm and root diameter 3.0–3.1 mm.

The irregularity in, for example, the width of the grooves was a little greater than that of Example 1 but was found to be within a practical tolerance.

COMPARATIVE EXAMPLE 1

The same tension cable 16a as in Example 1 was employed and, after degreasing thereof, a spacer body 11 was formed of HDPE directly around the tension cable 16a. The spacer body 11 was formed with target dimensions of: outer diameter d4 5.7 mm, root diameter d3 3.0 mm, helical pitch 150 mm. Thus, the target ratio d1/d3 was set to 0.40.

The resulting spacers had actual dimensions of: outer diameter 5.5–5.7 mm and root diameter 2.9–3.3 mm.

The width of the grooves at the periphery of the spacer body was irregular over the wide range of 0.9–1.5 mm, and the depth of the grooves was unmeasurable because of deformation.

EXAMPLE 3

As a tension cable 16a was employed a stranded steel cable with an apparent diameter d1 of 1.8 mm which was formed by stranding seven steel wires each having a diameter of 0.6 mm (disposing one wire at the center and six around it). This stranded steel cable was sheathed by a thermoplastic resin layer 16b of HDPE to make a tension member 16 having a diameter d2 of 4.0 mm. Then, a spacer body 11 having five equally spaced grooves 12 was formed of HDPE around the tension member 16 with target dimensions of outer diameter d4 9.0 mm, root diameter d3 4.2 mm, helical pitch 400 mm. The target ratio d2/d3 was set to 0.95.

The resulting spacers had actual dimensions of: outer diameter 8.7–8.8 mm and root diameter 4.15–4.25 mm.

The width and depth of the grooves were substantially regular and in the range of 2.0–2.2 mm. Also, substantially no deformation was found and the spacer 10 had a cross-section as desired.

COMPARATIVE EXAMPLE 2

As a tension member 16 was employed a stranded steel cable with an apparent diameter d1 of 1.8 mm. A spacer body 11 with five grooves was formed of HDPE with target dimensions of: outer diameter d4 9.0 mm, root diameter d3 4.5 mm, helical pitch 400 mm. The target ratio d1/d3 was 0.40.

The resulting spacers had an outer diameter of 8.7–9.0 mm, but the root diameter was unmeasurable.

The dimensional irregularity of the grooves was quite large and the spacer did not have a desired shape.

EXAMPLE 4

As a tension member 16 was employed a stranded steel cable with an apparent diameter d1 of 4.8 mm which was formed by stranding seven steel wires each having a diameter of 1.6 mm (disposing one wire at the center and six around it). Then, a spacer body 11 with six grooves 12 was formed of HDPE with target dimensions of outer diameter d4 10.0 mm, root diameter d3 6.0 mm, helical pitch 300 mm. Thus, the target ratio d1/d3 was 0.80.

The resulting spacers had dimensions of: outer diameter 9.8–10.0 mm and root diameter 5.8–6.1 mm. The dimensional irregularity and deformation of the grooves were found to be small.

EXAMPLE 5

As a tension member 16 was employed a single steel wire having a diameter d1 of 2.0 mm. Then, a spacer body 11 with four grooves 12 was formed of HDPE with target dimensions of outer diameter d4 6.0 mm, root diameter d3 2.8 mm, helical pitch 200 mm. The target ratio d1/d3 was set to 0.71.

The resulting spacers had dimensions of to outer diameter 5.96–6.07 mm and root diameter 2.76–2.88 mm. As in the above Examples, the grooves had a desired shape with dimensional accuracy.

EXAMPLE 6

As a tension cable 16a was employed a glass fiber reinforced plastics (GFRP) rod having a diameter d1 of 3.5 mm which was sheathed by a thermoplastic resin layer 16b of LLDPE to make a tension member 16 having a diameter d2 of 5.5 mm. Then, a spacer body 11 with twelve grooves 12 was formed of HDPE with target dimensions of: outer diameter d4 9.5 mm, root diameter d3 7.0 mm, helical pitch 300 mm. The target ratio d2/d3 was thus set to 0.79.

The resulting spacers had dimensions of: outer diameter 9.69–9.75 mm and root diameter 6.68–6.73 mm. The dimensional irregularity of the grooves was small and deformation thereof was scarcely observed.

In this Example, a test was carried out by heating the tension member 16 until the surface temperature thereof rose to 70°–80° C. before it was introduced into the die 20. Another test was made in which the tension member 16 was fed into the die 20 without preheating, the surface temperature being about 30° C. These tests revealed that an adhesive strength between the tension member 16 and the spacer body 11 was increased by the preheating. Therefore, if it is desired to expose the tension member 16 by removing or peeling, off the spacer body 11 for, for example, splicing of an optical fiber cable, this may be achieved by adjusting the surface temperature of the sheathed tension member 16 before the spacer body molding process.

EXAMPLE 7

As a tension cable 16a was employed a glass fiber reinforced plastics (GFRP) core with diameter d1 of 2.0 mm which was sheathed by a thermoplastic resin layer 16b of a mixture of HDPE and LLDPE in order to make a tension member 16 having a diameter d2 of 4.0 mm. Then, a spacer body 11 with twelve grooves 12 was formed of HDPE with target dimensions of: outer diameter d4 9.5 mm, root diameter d3 7.0 mm, helical pitch 250 mm. The target ratio d2/d3 was 0.57.

The resulting spacers had dimensions of: outer diameter 9.73–9.83 mm and root diameter 6.68–7.05 mm. The grooves had a shape as designed with dimensional accuracy.

COMPARATIVE EXAMPLE 3

As a tension cable 16a was employed a glass fiber reinforced plastics (GFRP) core with a diameter d1 of 2.0 mm which was sheathed by a thermoplastic resin layer 16b of LLDPE to complete a tension member having a diameter d2 of 3.0 mm. Then, a spacer body 11 with twelve grooves 12 was formed of HDPE with target dimensions of: outer diameter d4 9.5 mm, root diameter d3 7.0 mm, helical pitch 300 mm. The target ratio d2/d3 was 0.43.

The resulting spacers had dimensions of: outer diameter 9.65–9.85 mm and root diameter 7.13–7.28 mm. However, neither the shape nor dimensional regularity of the grooves was satisfactory.

COMPARATIVE EXAMPLE 4

As a tension cable 16a was employed a glass fiber reinforced plastics (GFRP) core with a diameter d1 of 2.0 mm which was sheathed by a thermoplastic resin layer 16b of HDPE to complete a tension member having a diameter d2 of 3.0 mm. Then, a spacer body 11 with six grooves 12 was formed of HDPE with target dimensions of: outer diameter d4 13.0 mm, root diameter d3 6.5 mm, helical pitch 330 mm. The target ratio d2/d3 was thus set to 0.46.

The resulting spacers had dimensions of: outer diameter 13.0–13.4 mm and root diameter 6.5–6.7 mm. As in the above Comparative Example 3, however, the shape and the dimensional regularity of the grooves both were unsatisfactory.

EXAMPLE 8

As a tension cable 16a was employed a stranded steel cable with an apparent diameter d1 of 4.8 mm which was formed by stranding seven steel wires each having a diameter of 1.6 mm (disposing one wire at the center and six around it). This stranded steel cable was sheathed by a thermoplastic resin layer 16b of HDPE to make the tension member 16, and then the tension member 16 was lead through a trimming die for diametrical uniformity, resulting in a diameter d2 of 10.8±0.05 mm. Then, a spacer body 11 with twelve square (in cross-section) grooves 12 was formed of HDPE around the sheathed, tension member with target dimensions of: outer diameter d4 16.0 mm, root diameter d3 11.0 mm, helical pitch 400 mm. The target ratio d2/d3 was 0.982.

The resulting spacers had dimensions of: outer diameter 16.0–16.2 mm and root diameter 10.9–11.1 mm. The grooves were square shaped substantially as designed with dimensional accuracy.

The following Table 1 shows the condensed description of all the above examples.

TABLE 1

| | | Item | Example 1 | Example 2 | Comparative Example 1 | Example 3 | Comparative Example 2 | Example 4 |
|---|---|---|---|---|---|---|---|---|
| Tension | Tension | Type | Stranded | Stranded | Stranded | Stranded | Stranded | Stranded |

TABLE 1-continued

| member | Cable | | | Steel Wires | Wires | Wires | Wires | Wires | Wires |
|---|---|---|---|---|---|---|---|---|---|
| | | | Apparent Diameter d1 (mm) | 1.2 | 1.2 | 1.2 | 1.8 | 1.8 | 4.8 |
| | | | Diameter of Single Wire (mm) | 0.38 | 0.38 | 0.38 | 0.6 | 0.6 | 1.6 |
| | | | Structure | 3 + 6 | 3 + 6 | 3 + 6 | 1 + 6 | 1 + 6 | 1 + 6 |
| | Sheathing Plastics | Material | | LLDPE | HDPE | — | HDPE | — | — |
| | | Outer Diameter d2 (mm) | | 2.8 | 2.0 | — | 4.0 | — | — |
| Spacer Body | Outer Diameter d0 (mm) | | | 2.8 | 2.0 | 1.2 | 4.0 | 1.8 | 4.8 |
| | Material | | | HDPE | HDPE | HDPE | HDPE | HDPE | HDPE |
| | Root Diameter* d3 (mm) | | | (3.0) 2.8–2.9 | (3.0) 3.0–3.1 | (3.0) 2.9–3.3 | (4.2) 4.15–4.25 | (4.5) Unmeasurable | (6.0) 5.8–6.1 |
| | Outer Diameter* d4 (mm) | | | (5.7) 5.5–5.65 | (5.7) 5.8–5.9 | (5.7) 5.5–5.7 | (9.0) 8.7–8.8 | (9.0) 8.7–9.0 | (10.0) 9.8–10.0 |
| | Number of Grooves | | | 6 | 6 | 6 | 5 | 5 | 6 |
| | Pitch (mm) | | | 150 | 155 | 150 | 400 | 400 | 300 |
| | Grooves | | | | | | | | |
| | Peripheral Width (mm) | | | 1.15–1.3 | 0.9–1.2 | 0.9–1.5 | 2.0–2.2 | 1.3–1.8 | 2.0–2.4 |
| | Bottom Width (mm) | | | 1.1–1.25 | 1.0–1.3 | Unmeasurable | 2.0–2.1 | 1.1–1.6 | 1.5–1.8 |
| | Depth (mm) | | | 1.1–1.2 | 1.0–1.2 | Unmeasurable | 2.05–2.10 | 1.4–1.6 | 1.7–2.0 |
| | Shape | | | | | Bad | | Bad | |
| | d0/d3 | | | 0.93 | 0.67 | 0.4 | 0.95 | 0.4 | 0.8 |

| | | Item | Example 5 | Example 6 | Example 7 | Comparative Example 3 | Comparative Example 4 | Example 8 |
|---|---|---|---|---|---|---|---|---|
| Tension member | Tension Cable | Type | Single Wire | GFRP | GFRP | GFRP | GFRP | Stranded Wires |
| | | Apparent Diameter d1 (mm) | 2.0 | 3.5 | 2.0 | 2.0 | 2.0 | 4.8 |
| | | Diameter of Single Wire (mm) | — | — | — | — | — | 1.6 |
| | | Structure | — | — | — | — | — | 1 + 6 |
| | Sheathing Plastics | Material | — | LLDPE | LLDPE/HDPE | LLDPE | HDPE | HDPE |
| | | Outer Diameter d2 (mm) | — | 5.5 | 4.0 | 3.0 | 3.0 | 10.8 |
| Spacer Body | Outer Diameter d0 (mm) | | 2.0 | 5.5 | 4.0 | 3.0 | 3.0 | 10.8 |
| | Material | | HDPE | HDPE | HDPE | HDPE | HDPE | HDPE |
| | Root Diameter* d3 (mm) | | (2.8) 2.76–2.88 | (7.0) 6.68–6.73 | (7.0) 6.86–7.05 | (7.0) 7.13–7.28 | (6.5) 6.5–6.7 | (11.0) 10.9–11.1 |
| | Outer Diameter* d4 (mm) | | (6.0) 5.96–6.07 | (9.5) 9.69–9.75 | (9.5) 9.73–9.83 | (9.5) 9.65–9.85 | (13.0) 13.0–13.4 | (16.0) 16.0–16.2 |
| | Number of Grooves | | 4 | 12 | 12 | 12 | 6 | 12 |
| | Pitch (mm) | | 200 | 300 | 250 | 300 | 330 | 400 |
| | Grooves | | | | | | | |
| | Peripheral Width (mm) | | 1.4–1.7 | 1.2–1.4 | 1.3–1.6 | 1.3–1.85 | 1.8–3.2 | 2.0–2.4 |
| | Bottom Width (mm) | | 1.3–1.6 | 1.2–1.4 | 1.3–1.5 | 1.4–1.65 | 1.9–3.6 | 2.0–2.4 |
| | Depth (mm) | | 1.3–1.45 | 1.3–1.4 | 1.1–1.3 | 0.9–1.2 | 2.5–3.4 | 2.2–2.4 |
| | Shape | | | | | Bad | Bad | |
| | d0/d3 | | 0.71 | 0.79 | 0.57 | 0.43 | 0.46 | 0.982 |

*Values in parentheses are target dimensions.

As can be seen from Table 1, when the target ratio of the diameter d0 (d1 or d2) of the tension member 16 to the root diameter d3 of the spacer body 11 satisfies the expression $0.5 < d0/d3 < 1$, the resulting spacers will have sufficient dimensional accuracy and uniform shape of the grooves therefore be suitable for supporting optical fibers.

Figure 3B:
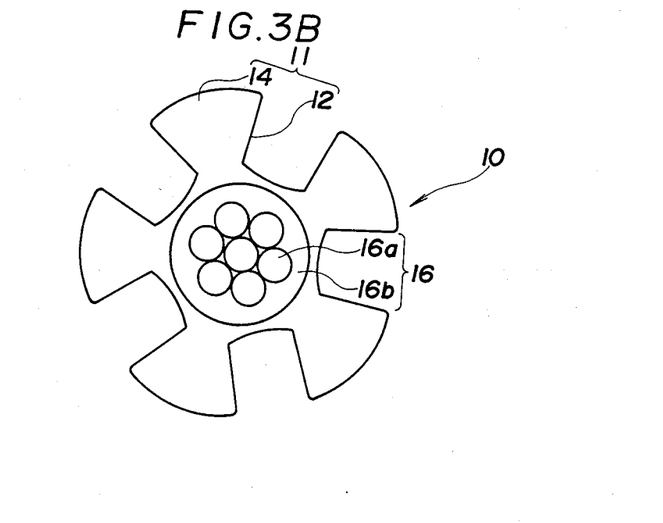

FIG. 3A is an enlarged (about ten times) cross section of the spacer 10 formed in accordance with the method of Comparative Example 2, from which it will be observed that the grooves 12 were extensively deformed though they had been designed to have square cross sections. On the other hand, the spacer 10 illustrated in FIG. 3B, which was formed in accordance with the method of Example 3, had grooves 12 of square section as designed. The spacers in all of the above Examples were provided with helical grooves by using the rotary die. However, the present invention may of course be applicable to the manufacture of spacers having linear grooves, and it will be understood that the same effects as with the helical grooves may be achieved.

Figure 4:
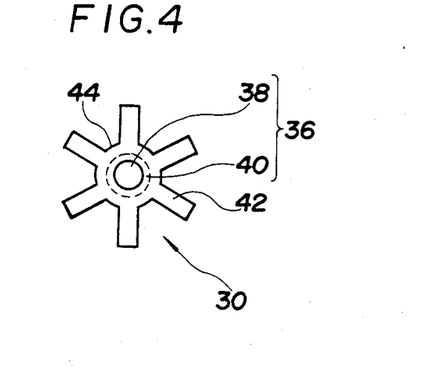
FIG. 4 is a cross-sectional view illustrating a spacer of an optical fiber cable according to another embodiment of the invention.
Figure 5:
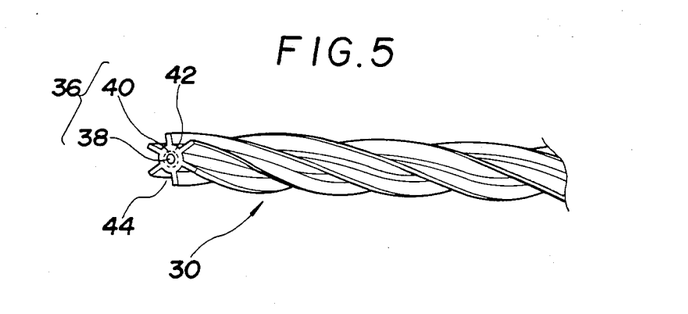
FIG. 5 is a perspective view of the spacer of FIG. 4.

A spacer 30 illustrated in FIGS. 4 and 5 includes a tension member 36 which comprises a tension cable 38 formed of fiber reinforced thermosetting resin and a sheathing or intermediate thermoplastic resin layer 40 covering the tension cable. In this embodiment, the tension member 36 is manufactured in accordance with a method shown in FIG. 6.

Figure 6:
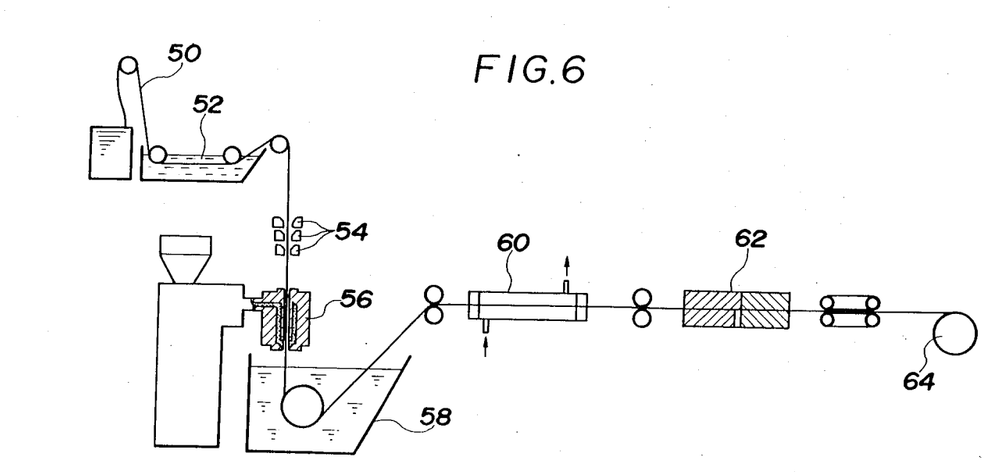
FIGS. 6 and 7 are schematic views for use in explanation of a method for forming the spacer according to another embodiment of the invention.

The method starts with impregnating a reinforcing fiber bundle 50 with uncured thermosetting resin 52. The bundle 50 may comprise a plurality of rovings of glass fibers having a filament diameter of about 9 to 13 $\mu$m, aromatic polyamide fibers and the like. A preferred example of the thermosetting resin comprises unsaturated polyester containing unsaturated alkid resin and polymeric monomer such as styrene, and a few parts of peroxide catalyst. The resin impregnated bundle is then led through squeezing dies 54 having predetermined cross sections so as to shape the bundle squeezing off excessive resin. Provided downstream of the squeezing dies 54 is an extruding die 56 which extrudes a molten thermoplastic resin in a ring form to enclose the uncured bundle, and the thermoplastic resin is then immediately cooled and solidified through a water tank 58 to form the intermediate layer 40. The thermoplastic resin of this layer is so selected that the layer 40 can be fused integrally with a spacer body as described below.

The uncured bundle enclosed by the intermediate layer is consecutively introduced into a curing tank 60 which is heated by a pressurized thermal medium such as pressurized vapor or liquid, whereby the thermosetting resin in the FRP tension cable is hardened. The temperature of the thermal medium is set in the vicinity of a melting point of the intermediate layer, so that heat generated during the curing process of the FRP cooperates with the thermal medium to melt the inner portion of the intermediate layer. Therefore, the outer surface of FRP and the inner surface of the layer contact each other in a semifluid state under pressure before the thermosetting resin is completely hardened. This results in roughened junction surfaces which enables a firm adhesion between the tension cable 38 and the intermediate layer 40 due to an anchor effect.

The molding thus formed does not always have a uniformly regularized diameter and a smooth outer surface throughout its length. It is therefore preferable to size and shape the molding by passing it through a shaping die 62 before the molding is drawn on a bobbin 64 as the tension member 36.

Figure 7:
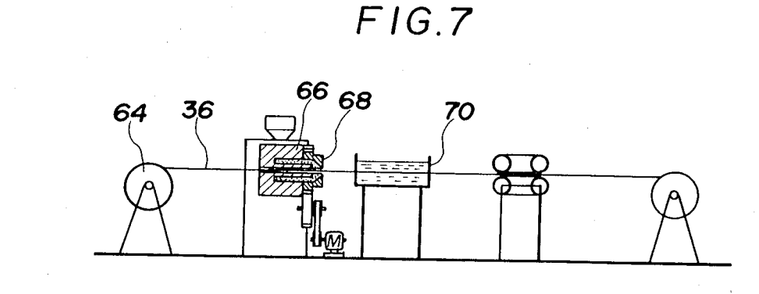

Next, the tension member 36 is led through a cross-head die 66 illustrated in FIG. 7, similar to the die 20 in FIG. 1, which extrudes a molten thermoplastic resin through a rotary nozzle 68 to enclose the tension member 36. By cooling and solidifying this thermoplastic material in a water tank 70, a spacer body 42 having a plurality of helical grooves 44 is formed on the tension member 36 as illustrated in FIGS. 4 and 5. The thermoplastic resin for the spacer body 42 should have a fusibility with the resin of the intermediate layer 40 so that these thermoplastic layers may constitute an integral and substantially unitary structure. Preferred examples of the material of spacer body 42 are nylons, ABS resins and homopolymers or copolymers of polyethelene and polypropylene.

The spacer 30 formed in accordance with the above method has a sufficient adhesive strength, more than 60 kg/cm$^2$, between the FRP tension cable 38 and the intermediate layer 40. This is due to the anchor effect achieved by the roughened interface. It is believed, though not yet confirmed, that a polymeric monomer such as styrene in the thermosetting resin and/or peroxide as a hardening catalyst are partly transferred into or acted on the molten thermoplastic resin to provide a cross-linking structure at the interface. This may be another factor of the increased adhesive strength. Also, the intermediate layer 40 and the spacer body 42 are fused together. Therefore, the FRP tension cable and the thermoplastic coating including the spacer body are firmly maintained in adhesion.

Examples were prepared and will be described below.

EXAMPLE 9

A bundle comprising glass rovings of 13 μm monofilament diameter was impregnated with a liquid thermosetting resin which was prepared by mixing an unsaturated polyester resin ("Ester H-8000" made by Mitsui Toatsu Chemicals, Inc.) containing a styrene as a polymeric monomer with two parts of catalyst consisting of benzoyl peroxide. The resin impregnated bundle was, after being shaped by squeezing dies to have an outer diameter of 2 mm, introduced into a first cross-head die where a high-density polyethylene ("Hi-Zex 6300M" made by Mitsui Petrochemical K.K., melt index 0.1, gravity 0.952) was extruded in a ring shape having a thickness of 0.6 mm around the bundle. The thermoplastic material was immediately cooled and solidified through a water tank to form an intermediate layer sheathing the uncured bundle. The resultant molding was subsequently led through a curing tank maintained at a temperature of 140° C. by a vapor pressurized to 3.7 kg/cm$^2$, therby hardening the thermosetting resin in the bundle. Thereafter, the intermediate layer was shaped and sized through a shaping die which was heated to 150° C. so that the outer surface portion of the thermoplastic layer was softened.

A tension member thus formed had a FRP tension cable of 2.0 mm diameter and 75% by weight of glass fiber content and an intermediate layer having an outer diameter of 3.0 mm. This tension member was then introduced into a second cross-head die having a rotary nozzle from which a high-density polyethylene of the same type as used in the intermediate layer was extruded in such a manner that, after being cooled and solidified, there was formed a spacer body 42 having thereon six helical grooves 44 each of 150 mm pitch and having an outer diameter of 6.4 mm measured at the top of ribs and a root diameter of 4.0 mm measured at the bottom of grooves, as illustrated in FIGS. 4 and 5.

The adhesive strength between the FRP tension cable and the intermediate layer was measured in the following manner. First, a spacer was cut into a sample of 200 mm length and an annular groove or notch was provided at a position 20 mm from one end of the sample throughout the whole thickness of the thermoplastic layers, i.e. the spacer body and intermediate layer. Then, sheet-like handle portions, each of about 50 mm length and formed of the same resin as the thermoplastic layers, were bonded to both ends of the sample with overlapped sections each of 18 mm length. A tensile test was conducted in the longitudinal direction at a speed of 5 mm/min, and a value when the thermoplastic layers of the above 20 mm portion was peeled off from the FRP tension cable was sought. The adhesive strength was calculated by dividing the measured value by the surface area of the FRP. It is to be noted here that values of the adhesive strength referred to in any Examples and Comparative Examples below were measured in the above manner.

The test indicated that the adhesive strength in this Example was 144 kg/cm$^2$.

Another test, i.e. a thermo cycle test, was carried out to determine durability of adhesion between the FRP tension cable and the thermoplastic portions. Prepared for this test was a 400 mm length sample of the spacer which was subjected to a temperature of −30° C. for an hour and then +60° C. for the same period of time, this cycle being repeated thirty times. The test resulted in finding no dimensional change of the thermoplastic portions relative to the FRP tension cable at both end surfaces of the sample. Further, a subsequent tensile test revealed that the sample maintained the adhesive strength of 144 kg/cm$^2$ even after the above thermo cycle test.

EXAMPLE 10

An uncured bundle of 1.0 mm diameter was prepared using the same glass rovings and thermosetting resin as used in Example 9, and was covered with a linear low-density polyethylene ("GRSN-7047" made by Nippon Unicar Co., Ltd., melt index 1.0, gravity 0.918) of 0.5 mm thickness. A tension member having an outer diameter of 2.8 mm was then formed by cooling the polyethylene, heat-hardening the thermosetting resin and shaping as in Example 9. A high density polyethylene ("SHOLEX 5300w" by SHOWA DENKO K.K., melt index 0.30, gravity 0.949) was used to form a spacer body which had four helical grooves, each of 100 mm helical pitch a 5.2 mm outer diameter and 3.8 mm root diameter.

The resultant spacer was subjected to the tensile test and found to have an adhesive strength of 106 kg/cm$^2$ which was entirely maintained after the same thermo cycle test as in Example 9.

EXAMPLE 11

Employed as reinforcing fibers were aromatic polyamid fibers ("Kevler 49" by Dupont, 1420 denier) which were impregnated with an unsaturated polyester resin ("3464" of JAPAN U-PICA CO., LTD.) added with the same catalyst as in Example 9, and the uncured bundle was, after being sized to 3 mm diameter covered with an ABS resin modifyed by urethane ("440" of UBE CYCON CO., LTD., melt index 1.5, gravity 1.107) of 0.8 mm thickness. Subsequently to solidification of the intermediate layer, the thermosetting resin was hardened through the curing tank heated to 150° C. by vapor under saturated pressure, and a tension member was formed which consisted of a FRP tension cable of 3.0 mm diameter and 65% by weight of reinforcing fiber content and an intermediate layer having an outer diameter of 4.6 mm. The modified ABS resin of the type used for the intermediate layer was employed to form a spacer body having six helical grooves, each of 300 mm pitch, and diametered to 15 mm at ribs and 7 mm at grooves.

The spacer was found to have an adhesive strength of 152 kg/cm$^2$. The thermo cycle test indicated no dimensional deformation of the thermoplastic portions relative to the FRP core, and the adhesive strength was fully maintained.

EXAMPLE 12

An uncured bundle enclosed by an intermediate layer was prepared in the same manner as in Example 9. After the thermosetting resin was hardened by water heated to 140° C. and pressurized to 4 kg/cm$^2$, the thermoplastic layer was sized under a temperature of 150° C. to obtain a tension member of 3.0 mm diameter. Then molded around the tension member was a spacer body of the same high-density polyethylene as the intermediate layer so that the body had six helical grooves of 150 mm pitch and was diametered to 6.4 mm at the ribs and 4.0 mm at the grooves.

The tensile test indicated an adhesive strength of 142 kg/cm$^2$ which was maintained without any relative deformation after the thermo cycle test.

COMPARATIVE EXAMPLE 5

An uncured bundle of 2.0 mm diameter was prepared using the same glass rovings and thermosetting resin as in Example 9 and was introduced into a cylindrical die which had an inner diameter of 2.0 mm and a length of 50 cm with a mirror-grinded inner surface. The die was heated to 140° C. by infrared heater and the thermosetting resin was hardened by passing the bundle through the die at a speed of 60 cm/min, resulting in a FRP core of 2.0 mm diameter and 75% by weight of glass fiber content. A spacer body was then formed around the FRP core from the same thermoplastic resin, under the same conditions and to the same shape as in Example 9.

A spacer thus manufactured was found to have an insufficient adhesive strength, about 30 kg/cm$^2$. Further, the thermo cycle test resulted in deformation of the spacer body with both ends of the FRP core being protruded from the spacer body by 3.4 mm.

COMPARATIVE EXAMPLE 6

The same FRP core as in Comparative Example 5 was prepared and then covered with an intermediate layer and a spacer body in the same manner as in Example 9. The resultant spacer had an adhesive strength of only 25 kg/cm$^2$, with deformation of the helical grooves and with FRP core protruding from the ends by 3.7 mm after the thermo cycle test.

The above test results, as well as tensile strength and modulus of elasticity observed in tests wherein samples of 150 mm length were subjected to tensile stress of 5 mm/min, are summarized in the following Table 2.

TABLE 2

| | | | | Example 9 | Example 10 | Example 11 |
|---|---|---|---|---|---|---|
| Tension Member | FRP | Reinforcing Fiber | | Glass Roving | Glass Roving | Aromatic Polyamid |
| | | Content of Fiber | wt % | 75 | 75 | 65 |
| | | Unsaturated Polyester Resin | Tradename (Manufacturer) | Ester H-8000 (Mitsui Toatsu) | Ester H-8000 (Mitsui Toatsu) | 3464 (JAPAN U-PICA) |
| | | Diameter of Squeezing Die | mm | 2.0 | 1.0 | 3.0 |
| | Intermediate Layer | Material (Melt Index) | (g/10 min) | HDPE (0.1) | LLDPE (1.0) | Modified ABS (1.5) |
| | | Thickness | mm | 0.6 | 0.5 | 0.8 |
| | Curing Tank | Pressure | kg/cm$^2$ | 3.7 | 3.7 | 4.9 |
| | | Temperature | °C. | 140 | 140 | 150 |
| | Shaping Die | Temperature | °C. | 150 | 150 | — |
| | | Diameter | mm | 3.0 | 1.8 | — |
| | Diameter of Tension Member | | mm | 3.0 | 1.8 | 4.6 |
| Spacer Body | | Material (Melt Index) | (g/10 min) | HDPE (0.1) | HDPE (0.3) | Modified ABS (1.5) |
| | | Outer Diameter | mm | 6.4 | 5.2 | 15.0 |
| | | Root Diameter | mm | 4.0 | 3.8 | 7.0 |
| | | Number of Grooves | | 6 | 4 | 6 |
| | | Helical Pitch | mm | 150 | 100 | 300 |
| Physical Property | | Tensile Strength of FRP | kg/mm$^2$ | 145 | 153 | 170 |
| | | Modulus of Elasticity of FRP | kg/mm$^2$ | 4,800 | 4,860 | 6,500 |
| | | Adhesive Strength | kg/cm$^2$ | 144 | 106 | 152 |
| | | Results of Thermo Cycle Test (−30° C.~+60° C. 1 h × 30) | Deformation Protruded length of FRP (mm) | Not Observed 0 | Not Observed 0 | Not Observed 0 |

TABLE 2-continued

|  |  |  |  | Example 12 | Com. Example 5 | Com. Example 6 |
|---|---|---|---|---|---|---|
| Tension Member | FRP | Reinforcing Fiber | | Glass Roving | Glass Roving | Glass Roving |
| | | Content of Fiber | wt % | 75 | 75 | 75 |
| | | Unsaturated Polyester Resin | Tradename (Manufacturer) | Ester H-8000 | Ester H-8000 | Ester H-8000 |
| | | Diameter of Squeezing Die | mm | 2.0 | 2.0 | 2.0 |
| | Intermediate Layer | Material (Melt Index) | (g/10 min) | HDPE (0.1) | — — | HDPE (0.1) |
| | | Thickness | mm | 0.6 | — | 0.6 |
| | Curing Tank | Pressure | kg/cm² | 4.0 | — | — |
| | | Temperature | °C. | 140 | 140 | 140 |
| | Shaping Die | Temperature | °C. | 150 | — | — |
| | | Diameter | mm | 3.0 | — | — |
| | Diameter of Tension Member | | mm | 3.0 | 2.0 | 3.0 |
| Spacer Body | | Material (Melt Index) | (g/10 min) | HDPE (0.1) | HDPE (0.1) | HDPE (0.1) |
| | | Outer Diameter | mm | 6.4 | 6.4 | 6.4 |
| | | Root Diameter | mm | 4.0 | 4.0 | 4.0 |
| | | Number of Grooves | | 6 | 6 | 6 |
| | | Helical Pitch | mm | 150 | 150 | 150 |
| Physical Property | | Tensile Strength of FRP | kg/mm² | 142 | 132 | 135 |
| | | Modulus of Elasticity of FRP | kg/mm² | 4,730 | 4,300 | 4,350 |
| | | Adhesive Strength | kg/cm² | 142 | 30 | 25 |
| | | Results of Thermo Cycle Test (−30° C.~+60° C. 1 h × 30) | Deformation | Not Observed | Observed | Observed |
| | | | Protruded length of FRP (mm) | 0 | 3.4 | 3.7 |

As discussed above, various thermoplastic resins may be used for the intermediate layer and spacer body, and the particular material may be selected in view of the compressive strength required for the spacer body. In the above Examples the layer and spacer body were formed of thermoplastic material of the same kind, but they may be formed of different thermoplastic materials which have a good fusibility with each other.

It is to be noted that the adhesive strength between the FRP core and the intermediate layer will depend on conditions under which the thermosetting resin is hardened. This was proved by tests wherein pressure and temperature of the curing tank were varied, as will be described in detail.

Thus, glass rovings of 13 μm monofilaments were impregnated with unsaturated polyester resin (Ester H-8000, mixed with two parts of peroxide catalyst and shaped by squeezing dies into an uncured bundle of 2 mm diameter and 75% by weight of glass fiber content. This core was then covered with an intermediate layer formed of linear low density polyethylene ("GRSN-7047" by Nippon Unicar Co., Ltd., melt index 1.0, gravity 0.918) of 1.0 mm thickness. Thereafter, the thermosetting resin in the core was hardened through the curing tank and, at that time, a vapor, a pressurized water and silican oil were used as thermal-mediums to obtain seven samples (No. 1 to No. 7 in Table 3) by changing pressures and temperatures of the thermal mediums. The adhesive strength of each sample was measured in the same manner as in Example 9 except that an annular groove or notch in the intermediate layer was located 20 mm away from one end of the sample. The following Table 3 shows test results.

TABLE 3

| SAMPLE NO. | THERMAL-MEDIUM | HARDENING CON. PRESSURE | TEMPER.* | ADHESIVE STRENGTH |
|---|---|---|---|---|
| 1 | VAPOR | 2.05 kg/cm² | 120° C. | 74 kg/cm² |
| 2 | | 2.8 | 130 | 92 |
| 3 | | 3.7 | 140 | 106 |
| 4 | | 4.9 | 150 | 106 |
| 5 | | 6.3 | 160 | 102 |
| 6 | WATER | 4.0 | 140 | 103 |

TABLE 3-continued

| SAMPLE NO. | THERMAL-MEDIUM | HARDENING CON. PRESSURE | TEMPER.* | ADHESIVE STRENGTH |
|---|---|---|---|---|
| 7 | SILICON OIL | NORMAL PRESSURE | 140 | UNMEASURABLE** |

Note:
*TEMPERATURE
**UNMEASURABLE DUE TO POOR SHAPING

When a vapor is used as the thermal-medium, the vapor pressure was necessarily changed in order to change the temperature. The maximum adhesive strength was obtained at 140° C. and 150° C., and the shape of the tension member also was good. Regarding pressurized water, when tried at 140° C. under a pressure of 4 kg/cm², a similar result as that of a vapor at 140° C. was obtained. On the other hand, when silicon oil heated to 140° C. was supplied into the curing tank under normal pressure, the shape of the tension member was so poor that the adhesive strength thereof could not be measured. Also, the FRP core of Sample No. 7 became porous after hardening, and other physical properties of the FRP core such as tensile strength and modulus of elasticity were decreased. This inferiority of the shape of the core is because styrene in the thermosetting resin was partly evaporated and broke or destroyed the intermediate layer which was in the softened state.

Judging from the foregoing test results, it is believed that the pressure applied during the curing process prevents styrene (polymeric monomer) from evaporating to thereby enable the pressure-contact of the FRP core to the thermoplastic layer even during the curing reaction, resulting in the firm adhesion therebetween due to the anchor effect.

The anchor effect is achieved by a roughened or non-smooth interface between the FRP core the intermediate layer, and such roughened surfaces were actually observed by the present inventors. For such observation, two samples were obtained by dissolving the intermediate layers of spacers in Example 9 and Comparative Example 5, respectively, with a xylene solution so that the outer surface of the FRP core was exposed in each sample. An electron microscope set to 100 magnifications revealed that the FRP core of Example 9 had remarkably roughened surface compared with that of Comparative Example 5.

Generally speaking, the adhesive strength tends to increase as the hardness of the thermoplastic material becomes larger, this constituting another factor in selection of the thermoplastic material to be used. An increase of adhesive strength is believed to be due to an increase of energy necessary to deform the interface.

It is preferable, but not essential, that the intermediate layer be shaped after the thermosetting resin is hardened so as to render uniform the outer diameter of the tension member. A uniformly diametered tension member is advantageous in order to ensure that the FRP core is correctly positioned at the center of the spacer and in order to avoid the occurence of dimensional irregularity in the spacer.

As fully discussed hereinabove, the spacer of an optical fiber cable according to the present invention has increased adhesive strength between the FRP tension cable and the thermoplastic portions. This improves reliability of the spacer in protecting and carrying the optical fibers throughout their arrangement and use, and therefore the above spacer can be widely employed in cases where metallic material is not desired and where flexibility is particularly required.

Although the present invention has been described with reference to preferred embodiments and examples thereof, many modifications and alterations may be made within the spirit of the present invention.

What is claimed is:

1. A method for forming a spacer of an optical fiber cable comprising the steps of:
   forming a tension cable by impregnating a reinforcing fiber bundle with an uncured thermosetting resin;
   covering said tension cable with a molten thermoplastic resin, and cooling and solidifying said thermoplastic resin to form an intermediate layer;
   hardening said thermosetting resin by heating under pressure to thereby firmly adhere said intermediate layer to said tension cable due to an anchor effect;
   covering said intermediate layer with a molten thermoplastic resin fusible with said thermoplastic resin of said intermediate layer so that both resins are unitarily bonded together; and
   cooling and solidifying said second-mentioned thermoplastic resin to form a spacer body having thereon a plurality of helical grooves.

2. A method for forming a spacer of an optical fiber cable as claimed in claim 1, wherein the hardening step of said thermosetting resin includes the steps of introducing said tension cable covered by said intermediate layer into a curing tank and supplying thermal-medium with a temperature in the vicinity of the melting point of said first-mentioned thermoplastic resin into said curing tank under a pressure.

3. A method for forming a spacer of an optical fiber cable as claimed in claim 1, further comprising the step of sizing said intermediate layer through a shaping die after said thermosetting resin is hardened.

* * * * *